United States Patent [19]

McCullough

[11] Patent Number: 5,518,836
[45] Date of Patent: May 21, 1996

[54] FLEXIBLE CARBON FIBER, CARBON FIBER ELECTRODE AND SECONDARY ENERGY STORAGE DEVICES

[76] Inventor: Francis P. McCullough, 104 Fir Dr., Lake Jackson, Tex. 77566

[21] Appl. No.: 372,446

[22] Filed: Jan. 13, 1995

[51] Int. Cl.$^6$ .............................. H01M 6/48; D01F 9/12
[52] U.S. Cl. .............................. 429/94; 429/194; 429/210; 429/218; 423/447.2
[58] Field of Search .............................. 429/94, 194, 218, 429/223, 224; 423/447.1, 447.2

[56] References Cited

U.S. PATENT DOCUMENTS

| | | | |
|---|---|---|---|
| 4,830,938 | 5/1989 | McCullough et al. | 429/210 X |
| 4,865,931 | 9/1989 | McCullough et al. | 429/194 |
| 5,032,473 | 7/1991 | Hoge | 429/210 X |
| 5,082,594 | 1/1992 | Tsuzuki et al. | 429/210 X |
| 5,209,975 | 5/1993 | Miyazaki et al. | 423/447.1 |
| 5,227,237 | 7/1993 | Saruyama et al. | 423/447.2 |

*Primary Examiner*—Anthony Skapars
*Attorney, Agent, or Firm*—Nis H. Juhl

[57] ABSTRACT

A novel flexible carbon fiber is disclosed which has a generally non-circular or tubular cross-sectional shape, a Young's modulus of from greater than 1 MM psi (6.9 GPa) to 55 MM psi (380 GPa), and a bending strain value of from greater than 0.01 to less than 50%. The invention also resides in an electrode for a secondary energy storage device utilizing the carbon fibers of the invention and containing a non-aqueous electrolyte. The invention further resides in a secondary energy storage device comprising a water impermeable housing having at least two cells containing at least one shared bipolar electrode made of the flexible carbon fibers of the invention. Also disclosed is a pseudo bipolar electrode and terminal electrode for use in a lithium ion battery in which the fibers or a portion of the carbon fibers are coated with an ion active lithium salt of a metal oxide. Also disclosed is a novel battery stack and a method of manufacture of the secondary energy storage device.

33 Claims, 7 Drawing Sheets

FLEXIBLE CARBON FIBER, CARBON FIBER ELECTRODE AND SECONDARY ENERGY STORAGE DEVICES

FIELD OF THE INVENTION

The present invention relates to an electrically conductive carbon fiber derived from a stabilized polymeric precursor material, said fiber having a generally non-circular or tubular cross-sectional shape, a Young's modulus of from greater than 1 MM psi (6.9 GPa) to 55 MM psi (380 GPa), and wherein said carbon fiber is flexible and has a bending strain value of from greater than 0.01% to less than 50%.

The invention also relates to different types of electrodes, including bipolar electrodes and pseudo bipolar electrodes, made from a multiplicity of said flexible carbon fibers. The invention further relates to several different types of batteries employing at least one of said flexible carbon fiber electrodes and to a process for the manufacture of the flexible carbon fibers. The invention further resides in a lithium ion battery utilizing a pseudo bipolar electrode having a portion thereof coated with a lithium salt of a metal oxide.

BACKGROUND OF THE INVENTION

Electrical energy storage devices, particularly batteries, which employ fibrous carbon or graphite electrodes and which operate in a nonaqueous electrolyte at ambient temperature are known from U.S. Pat. No. 4,865,931, issued Sep. 12, 1989 to F. P. McCullough et al, the subject matter of which is, in its entirety, incorporated herein by reference. The patent generally discloses a secondary battery comprising a housing having at least one cell positioned in the housing, each cell comprising a pair of electrodes made of a multiplicity of electrically conductive carbon fibers, a foraminous electrode separator for electrically insulating the electrodes from contact with each other, and an electrolyte comprising an ionizable salt in a nonaqueous fluid in each cell.

A similar electrical storage device is disclosed in U.S. Pat. No. 4,830,938 to F. P. McCullough et al, issued May 16, 1989, the subject matter of which is incorporated herein, in its entirety, by reference. This patent discloses a fibrous carbonaceous electrode which is characterized as having a Young's modulus of greater than 1 MM psi (6.9 GPa) and a surface area with respect to the fibrous material of at least 0.1 m$^2$/g, most preferably less than 5 m$^2$/g. The patent additionally discloses a shared bipolar carbonaceous electrode which is capable of carrying a current from one cell to an adjacent cell without a current collector frame associated therewith and, when employed as the electrode in a series of adjacent cells of a battery, having a pair of terminal electrodes each provided with a collector frame at the terminal cells of the battery. The useable capacities of the circular cross-section fiber electrodes of these batteries was less than 1 Li per 6 carbons on the anode (negative electrode) side and less than 1 anion per 12 carbons on the cathode (positive electrode) side.

The physical shape of nongraphitic and electrically nonconductive polymeric fibers is described in Modem Textiles, second edition, 1982, by D. S. Lyle, John Wiley & Sons. In the chapter entitled "Fiber Properties", pp. 41 to 63, various natural and polymeric fibers are described having different surface contours, i.e. smooth, rough, serrated, etc. which are said to influence cohesiveness, resiliency, loft, and thickness. Polymeric fibers having various cross-sectional shapes are described in Table 2–9 on pages 52 and 53 and include tubular, triangular, irregular striated, oval, etc.

It is now well understood in this art that the carbon electrodes for secondary electrical energy storage devices require a special type of carbon or graphite, particularly when used as the positive electrode in nonaqueous battery systems due to destructive intercalation of large anions from the electrolyte entering between the planar graphite layers. These large anions which enter between the planar graphite layers (usually referred to as "d-spacing" in the art) cause spalling or flaking of the carbon or graphite layers and can thus bring about a rapid degradation of the electrode when subjected to repeated electrical charging and discharging cycles. Accordingly, destructive intercalation of large anions between the carbon or graphite layers of an electrode and electrolyte instability becomes a particular problem with rechargeable batteries, that operate with a nonaqueous electrolyte and that have a cell voltage of greater than 2.5 volts. Such batteries require exacting standards during their manufacture and operation to prevent the introduction of gaseous water or water vapor into the batteries since the introduction of only minute quantities of water into a battery, i.e. in the range of parts per million (ppm), results in the electrolysis of the water molecule. Electrolysis of water molecules can take place during electrical charging of the battery at a potential of greater than 2.5 V, during storage in the charged state, or during discharge of the battery, forming O, OH$^-$ and H$^+$ ions with the OH$^-$ ions migrating to the positively charged cathode where electrolysis to O and O$_2$ takes place. Species such as OH$^-$ and H$^+$ cause a breakdown of such commonly used nonaqueous electrolyte materials such as propylene carbonate through catalysis, while highly reactive O and O$_2$ destroy the surface of the carbon or graphite electrode due to destructive intercalation. McCullough et al report that their battery is capable of operating with a water content of up to 300 ppm but that it will have a somewhat reduced cycle life. McCullough et al also report that, if the water content should become onerous, the battery can be disassembled, dried and reassembled in a dried state without substantial damage to its continued operation.

BRIEF DESCRIPTION OF THE INVENTION

The invention particularly resides in an electrically conductive carbon fiber derived from a stabilized polymeric precursor material having a generally non-circular or tubular cross-sectional shape, a Young's modulus of from greater than 1 MM psi (6.9 GPa) to 55 MM psi (380 GPa), and wherein said carbon fiber is flexible and has a bending strain value of from about 0.01 to less than 50%, preferably, the carbon fiber has a bending strain value of from about 0.1 to about 30%.

It is a particular object of the invention to make electrodes from a multiplicity of flexible carbon fibers each having a generally noncircular shape when viewed in cross-section such as, for example, a multilobal, crescent, star, or the like. The surface contour of the fibers can be smooth or rough, and regular or irregular as, for example, in a trilobal, regular and symmetrical, smooth surface contour, or an irregular striated contour so long as the surface structural integrity is maintained and the fiber surface is contiguous and remains substantially free of pits and surface pores. By substantially free of pits and surface pores, it is meant that the fiber surface may still have some micropores provided, however, that these micropores do not represent more than 5% of the total surface area of the fiber.

It has been found that the substantially contiguous and uniform surface structure presented by the carbon fibers of the present invention further provides a solution to the problem of destructive anion intercalation typically found with porous and adsorptive carbon when used as the active positive electrode material. The carbon fibers of the invention, optionally, can have a generally tubular cross-sectional shape or can be provided with at least two interior passageways extending along the length of each fiber when viewed in cross-section.

The generally noncircular carbon fibers of the invention have a substantially higher surface area to unit mass ratio as well as a substantially contiguous conductive surface and, therefore, have a substantially greater practically useable electrical storage capacity per unit weight and significantly enhanced performance as compared to fibers having a substantially circular cross-section.

The flexible carbon fibers of the invention are essentially continuous, i.e. they can be made to any desired length, are not chopped or crimped, and possess a high degree of flexibility which manifests itself in a bending strain of from greater than 0.01 to less than 50%, preferably from about 0.1 to about 30%, that allow the fibers to be formed into a variety of complex electrode shapes and configurations for use in many types of applications for energy storage devices in use today. In contrast, the bending strain of conventional carbon fibers is substantially less than 0.01% and often less than 0.001% for extremely high modulus graphitic fibers. Moreover, the noncircular cross-sectional shape of the fibers of the invention increases the effective electron storage capacity per unit weight of the electrode. Presently, conventional carbon and graphite electrodes made from high modulus fibers with a Young's modulus of greater than 1 MM psi, typically from 30 to 55 MM psi. are limited in their applications in view of their extreme brittleness which makes their handling during fabrication difficult, resulting in excessive breakage of the fibers. Due to their generally circular cross-section, these stiff and brittle fibers also suffer from a comparatively reduced effective electrical storage capacity per unit weight of the electrodes.

The invention further resides in a high performance secondary energy storage device containing a terminal electrode comprising a collector frame formed of an electrically conductive material. The collector frame is coated with a lithium salt of a metal oxide (lithiated metal oxide) of the empirical formula $Li(MO_2)_n$ in which M is a metal selected from groups VIIb and VIIIb of the periodic table. The storage device also includes a pseudo bipolar electrode formed of a multiplicity of the flexible carbon fibers of the invention and having a portion thereof coated with a metal oxide $(MO_2)_n$ in which M is a metal selected from groups VIIb and VIIIb of the periodic table. Preferably, the metal oxide coating of the terminal and the portion of the pseudo bipolar electrode is selected from the group consisting of $CoO_2$, $NiO_2$ and $Mn_2O_4$.

The invention also resides in a flexible carbon fiber and electrode that can be made more easily and at a substantially lower manufacturing cost from an unfiltered polymeric precursor material such as, for example, an acrylic or sub-acrylic polymer that can contain from about 0.0001 to about 5% by weight particulate matter having a diameter of less than about 0.1 microns. Sub-micron particles are naturally present in any polymeric material and thus will also be present in polymeric precursor materials that are extruded to form fibers for use in the manufacture of textile articles, for example. These particles are generally organic or inorganic materials which are insoluble in the polymeric precursor melt or dope.

It is also contemplated and within the scope of the invention to introduce an additional quantity of sub-micron particulate matter, such as, for example, fumed silica, calcium oxide and various other inorganic materials such as silicates into the polymeric precursor material. It has been found that the addition of these sub-micron particles into the polymeric precursor material will reduce the formation of a high degree of order or crystallinity in the spun precursor fiber material. When the polymeric precursor fibers are subsequently heated and carbonized in a non-oxidizing atmosphere, they lack the stiffness, brittleness and high modulus that is normally associated with traditional carbon and graphitic fibers, while still exhibiting a low electrical resistivity and good uniform and contiguous surface structure, free from the voids, pores and pitting normally associated with adsorptive carbon materials. These characteristics differentiate the flexible carbon fibers of the invention from high surface area absorptive carbon materials. It is known in the art and an accepted standard, imposed by the Federal Trade Commission, that the term "acrylic" applies to any long chain synthetic polymers composed of at least 85 mole percent by weight of acrylonitrile units and less than 15 mole percent of another polymer. Carbon fibers made from acrylic precursor materials are generally wet spun and are limited to fibers having a circular cross-section.

In accordance with a further embodiment of the invention, it has been discovered that flexible carbon fibers and electrodes can be made from a polymeric precursor material that is derived from a sub-acrylic polymer and that is characterized by containing less than 85 mole percent acrylonitrile units and greater than 15 mole percent of another polymer, particularly a plasticizer such as a vinyl unit. More specifically, less than 85 mole percent acrylonitrile units can be blended with more than 15 mole percent, and as much as 35 mole percent of a plasticizer to render the blend more easily melt extrudable through an extrusion nozzle or nozzles while the polymer blend is in a heat softened condition. The so extruded, heat softened filament can be stretched and attenuated, while under tension, to form a finer denier filament (i.e. in which the unit length of the fiber is increased with respect to the weight) having a relatively smaller diameter as compared to extruded fibers made from a standard acrylic resin. The sub-acrylic resin of the invention can also be advantageously employed in extruding filaments having a noncircular or tubular cross-section.

The invention further resides in electrodes assembled from a multiplicity of the flexible carbon fibers of the invention, particularly for use in secondary electrical energy storage devices.

The invention additionally resides in a secondary energy storage device comprising a pair of electrodes and wherein at least the positive electrode comprises a multiplicity of electrically conductive, flexible carbon fibers of the invention. The non-circular shape of the fiber electrodes of the invention surprisingly give significantly higher useful capacities for both electrodes as compared to the circular cross-section fibers of McCullough et al. The useable capacities of the non-circular cross-section fibers of these batteries is 1 Li per 2 to 4 carbons on the anode side (negative electrode) and 1 anion per 6 to 10 carbons on the cathode side (positive electrode). This represents an increase of over 25% over the prior art in terms of the capacities with similar improvements in other performance aspects such as power density.

The invention further resides in a high performance secondary energy storage device comprising at least a pair of cells wherein the storage device contains at least one bipolar electrode formed of a multiplicity of the electrically conductive, flexible carbon fibers of the invention.

The invention further resides in a high performance secondary energy storage device comprising at least a pair of cells with one of the terminal cells containing a terminal electrode comprises a collector frame formed of an electrically conductive material. The collector frame is coated with a lithium salt of a metal oxide. Preferably, the metal oxide coating is selected from the group consisting of $CoO_2$, $NiO_2$ and $Mn_2O_4$. The storage device also includes at least one pseudo bipolar electrode comprising a multiplicity of the flexible carbon fibers of the invention having a portion thereof coated with said lithium salt of a metal oxide.

The invention also resides in a composite pseudo bipolar electrode comprising a multiplicity of the flexible carbon fibers of the invention, wherein a portion of the carbon fibers is coated with an ion conductive lithium salt of a metal oxide which serves as the initial source of lithium ions on charging the cell. Preferably, the metal oxide coating is selected from the group consisting of $CoO_2$, $NiO_2$ and $Mn_2O_4$.

The invention additionally resides in a process of making flexible carbon fibers having a non-circular or tubular cross-sectional shape with a Young's modulus of from greater than 1 MM psi (6.9 GPa) to 55 MM psi (380 GPa), and a bending strain of from about greater than 0.01 to less than 50%, preferably from about 0.1% to 30%.

The invention also resides in secondary battery stack comprising at least two batteries that are electronically connected by means of a bipolar or pseudo bipolar carbon fiber electrode of the invention.

DEFINITIONS

The term "non-circular" or "non-circular in cross-section" use herein generally refers to a fiber having a surface contour that can be smooth or rough, or regular or irregular in texture or shape. For example, a fiber can be multi-lobal, e.g. trilobal, in cross-section and have a regular and symmetrical cross-sectional shape as well as a smooth surface contour. Alternatively, a fiber can have an irregular striated, crinkled, or the like contour. Other cross-sectional shape that can be usefully employed are fibers having, for example, a dogbone, crescent, star, or the like cross-sectional shape. It would also be advantageous to make a tubular fiber or a fiber having 2 or more passageways extending along the longitudinal axis of the fiber.

The term "electrode structure" used herein applies to a multiplicity of fibers, fiber tows, a non-woven web or felt, or a woven, knit, or non-woven fabric made from continuous flexible carbon fibers or staple carbon fibers.

Although the term "Carbon fibers" is generally known to apply to fibers having a carbon content of greater than 92% by weight, while the term "Graphite fibers" is generally known to apply to fibers having a carbon content of greater than 98% by weight, it is intended herein that the term "carbon fibers" should apply to fibers having a carbon content of greater than 85% and up to 99% by weight. Accordingly, the term "carbon fibers" used herein is intended to be inclusive of "carbon" and "graphitic fibers". Preferably, the fibers of the invention have a carbon content of from about 95% to about 98% by weight.

The term "unfiltered" used herein applies to polymeric precursor materials which, when in a melt phase and during manufacture, are not subjected to the usual micro-filtration procedure to remove impurities, such as non-polymeric inclusions, from the precursor material. Unfiltered polymeric precursor materials that are usefully employed in the manufacture of flexible carbon fibers of the invention can contain from about 0.0001 to about 5% by weight particulate matter in which the particles have a diameter of less than about 0.1 microns, preferably less than 0.001 microns.

The term "sub-acrylic resin" used herein applies to a long chain polymer which is selected from the group consisting of copolymers and terpolymers, wherein the copolymers and terpolymers contain less than 85 mole percent acrylic units but more than 15 mole percent of one or more plasticizer units, such as vinyl units, copolymerized therewith.

The term "polymeric blends" applies to polymeric precursor materials that are suitable for forming the flexible carbon fibers of the invention and that are blended with other polymers, preferably plasticizers, which in the case of sub-acrylic polymeric materials are present at levels of greater than 15%, generally from greater than 15% up to 35%, preferably from greater than 15% to about 25% by weight.

The term "polymeric material" or "polymeric precursor material" used herein includes any polymers that are capable of being carbonized to form the flexible electrically conductive carbon fibers of the invention. Polymeric materials that can be suitably employed are well known in the art and are exemplified by copolymers and terpolymers of polyacetylene, polyphenylene, polyvinylidene chloride, polyacrylonitrile, and the like. Mesophase pitch (petroleum or coal tar) containing particulate impurities or additives can also suitably be employed. Preferably, the polymeric precursor material of the invention is a polyacrylonitrile or sub-acrylic polymer (as hereinbefore defined) in the form of fibers in which the fibers are subsequently carbonized in accordance with the procedure described in U.S. Pat. No 4,837,076, issued Jun. 6, 1989 to McCullough et al.

The term "plasticizer" or "polymeric plasticizer" used herein applies to any organic compound that can be added to or blended with a high polymer to facilitate processing and to increase the flexibility and toughness of the final product by internal modification (solvation) of the polymer molecule. Suitable plasticizers include, for example, vinyl chloride, methyl acrylate, methyl methacrylate, polyvinyl chloride and cellulose esters, phthalates, adipates, and sebacate esters, polyols such as ethylene glycol and its derivatives, tricresyl phosphate, caster oil, etc.

The term "bending strain" as used herein is as defined in Physical Properties of Textile Fibers by W. E. Morton and J. W. S. Hearle. The Textile Institute, Manchester, pages 407–409. The percent bending strain on a fiber can be determined by the equation $S=(r/R) \times 100$ where S is the percent bending strain, r is the effective cross sectional fiber radius and R is the radius of curvature of the bend. That is, if the neutral plane remains in the center of the fiber, the maximum percentage tensile strain, which will be positive on the outside and negative on the inside of the bend, equals $(r/R) \times 100$ in a circular cross section of the fiber.

The term "effective cross-sectional diameter" as it applies to a fiber having a generally circular cross-section, is the distance from one point along the outer surface of the fiber through the center of the fiber to an opposite point on its outer surface. In the case of a fiber having a generally non-circular cross-section, the effective cross-sectional diameter is the distance extending across a generally circular region where the core material of the fiber is solid and uninterrupted (see reference no.32 in FIG. 2A). By the term "generally circular cross-section of a fiber", it is also meant that the diameter of the generally circular in cross-section fiber can vary in its circularity due to the fact that during extrusion of the fiber the hot melt extrudate has a tendency to flow until it is sufficiently cooled to set. Thus, the cross-section of the fiber is not generally in the shape of a perfect circle but contains some slight variations in its circularity. The same applies to the non-circular fibers of the invention. For example, the hot polymer that is extruded through a tri-lobal die will continue to flow until the polymer is cooled sufficiently thus forming a tri-lobal fiber in which the individual lobes are not perfectly symmetrical.

The term "flexible" used herein is specifically applicable to carbon fibers having a bending strain value of from greater than about 0.01 to less than 50%, preferably from about 0.1 to 30%.

The term "stabilized" used herein applies to polymeric precursor fibers or tows which have been oxidized in an oxidizing atmosphere such as oxygen or air, at a specific temperature, typically less than about 350° C. for PAN (polyacrylonitrile) fibers, provided it is understood that in some instances the fibers can be oxidized by chemical oxidants at lower temperatures.

The term "energy storage device" used herein applies to electrical storage devices including those that are rechargeable such as, for example, secondary batteries, accumulators, capacitors, fuel cells, and the like.

The term "aspect ratio" is defined herein as the length to diameter (l/d) ratio of a fiber. The term "pseudo bipolar electrode" used herein is applicable to a carbon fiber electrode in which at least a portion thereof is coated with a lithium salt of a metal oxide. Optionally, the carbon fibers of the electrode can initially be coated with a conductive metal coating such as, for example, nickel, followed by a coating of a lithium salt of a metal oxide or lithiated metal oxide as it is sometimes referred to. The initial metal coating serving the purpose of providing a lower contact resistance and more secure bond for the metal oxide coating to the carbon fibers.

All percentages given herein are in "percent by weight" unless otherwise specified.

IN THE DRAWINGS

In FIG. 1, there is illustrated a planar cross sectional end view of a battery consisting of a single cell and employing a pair of terminal electrodes made of a multiplicity of the flexible carbon fibers of the invention.

Figure 4:
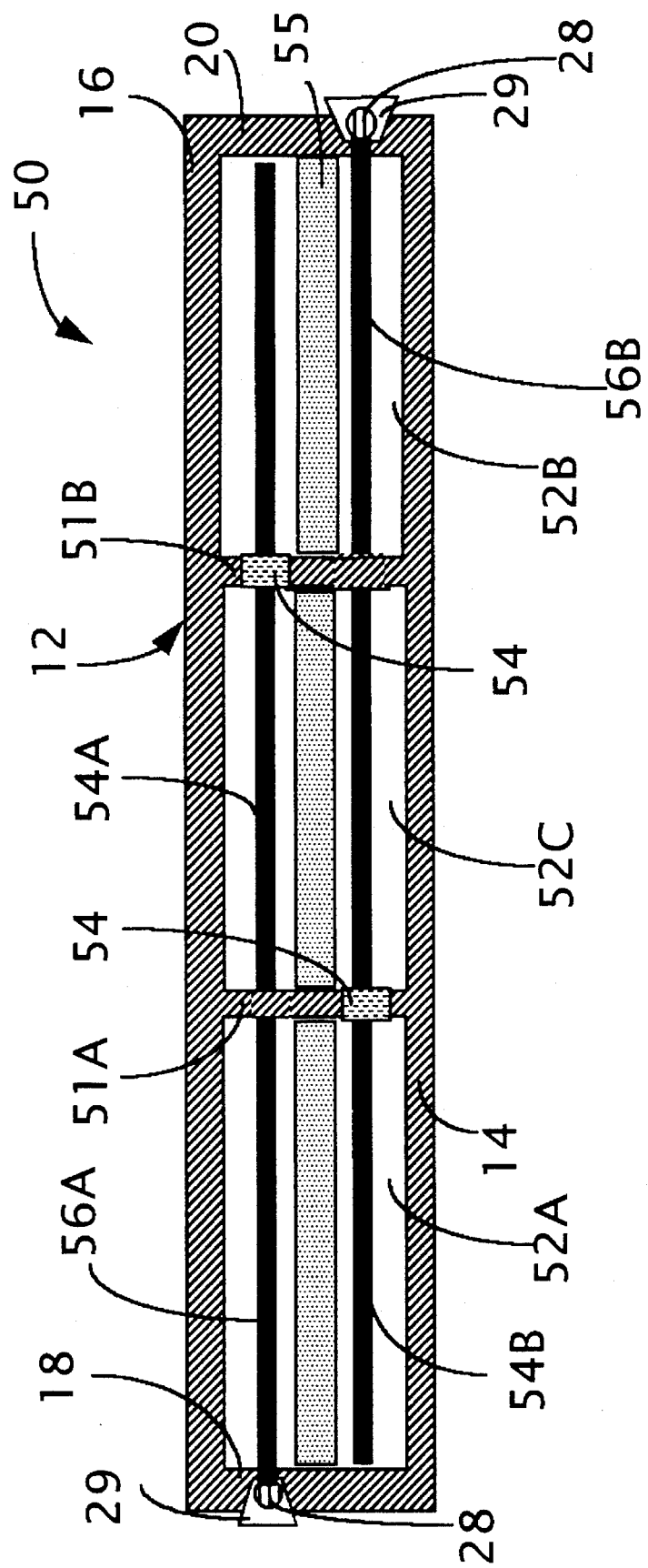

In FIG. 4, there is illustrated a planar cross-sectional side view of a battery comprising a housing having an interior chamber that is sub-divided into 3 cells. The interior chamber contains a pair of flat, planar terminal electrodes and a pair of flat, planar bipolar electrodes with each of the terminal electrodes being positioned in a facing relationship with a bipolar electrode. Wherein each of the terminal electrodes is positioned in an end cell and each of the bipolar electrodes extends through a separator wall into an intermediate cell. Thus, each terminal electrode is electrically associated with a counter electrode portion of a bipolar electrode.

Figure 3:
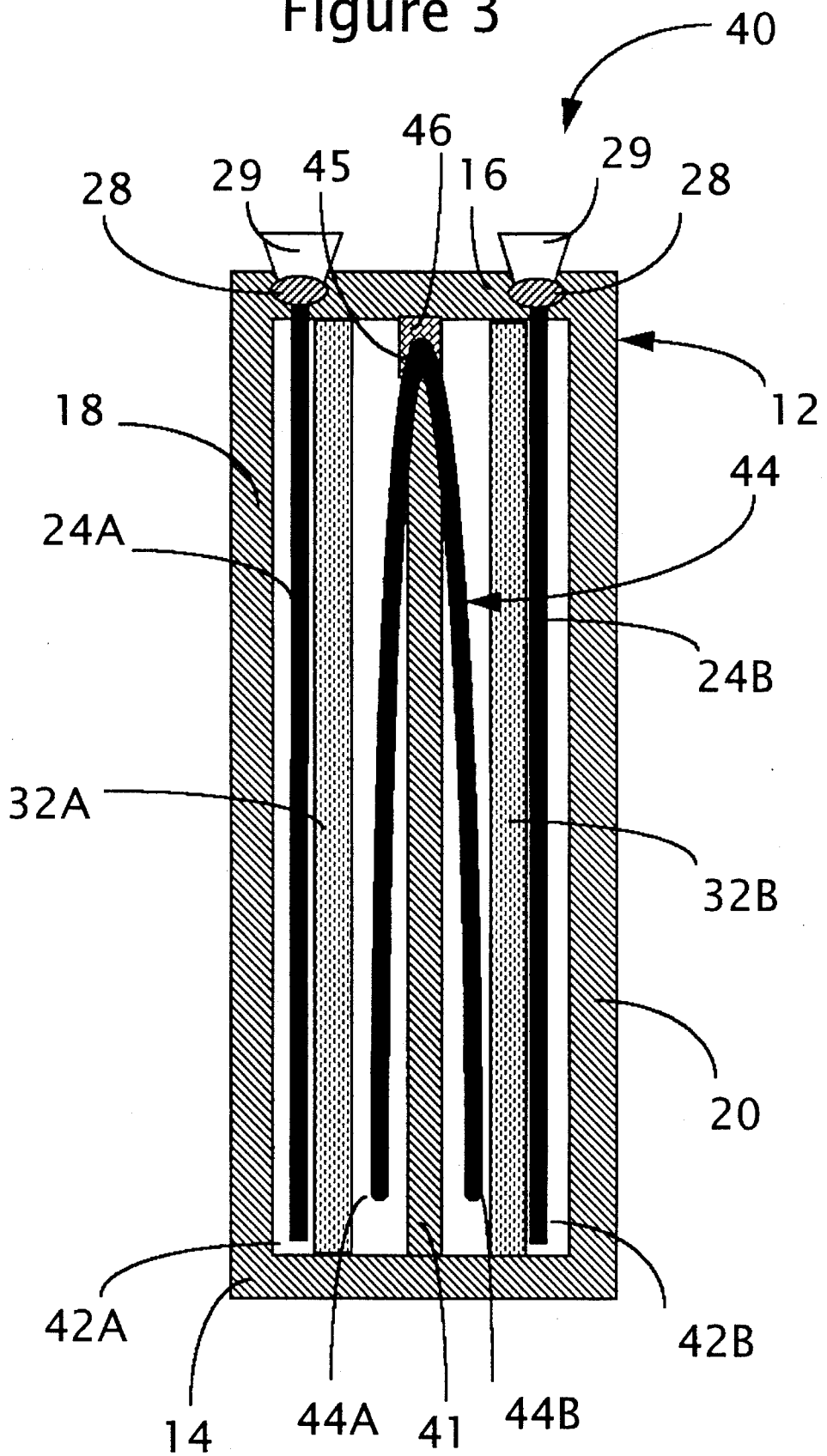
FIG. 3 is a planar cross sectional end view of a battery consisting of a pair of terminal cells, each cell having a terminal electrode and a bipolar electrode that is shared by the terminal cells, wherein portions of the bipolar electrode extend into each of the terminal cells to form a counter electrode with each of the terminal electrodes.
Figure 5:
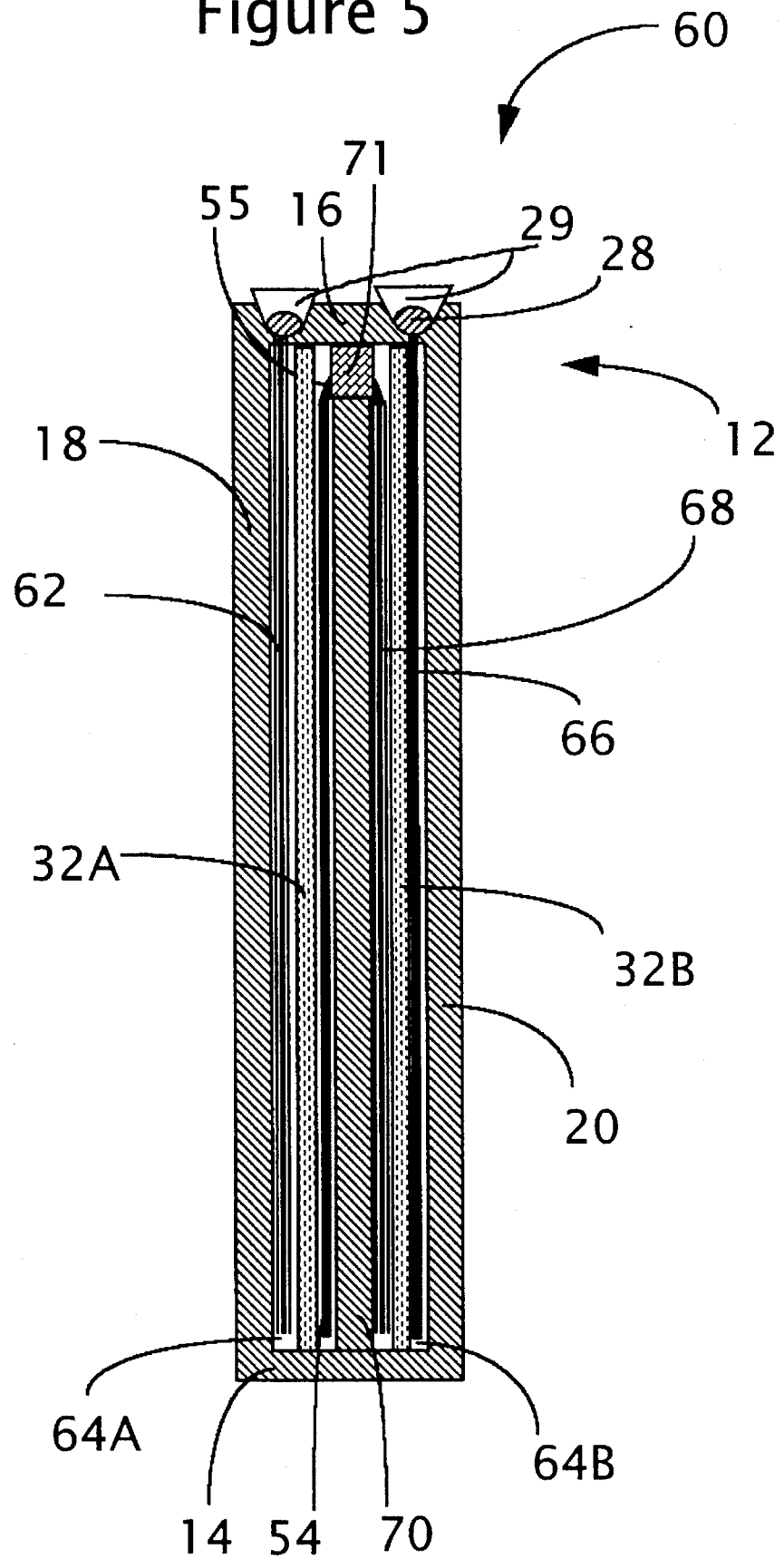

In FIG. 5, there is illustrated a planar cross sectional end view of a lithium ion battery which is similar in construction to the battery illustrated in FIG. 3, except that one of the terminal electrodes consist of an electrically conductive collector frame having a lithium salt of a metal oxide coating (in the fully discharged state) and a pseudo bipolar composite electrode is provided having a portion of the carbon fibers coated with a metal oxide coating.

Figure 5B:
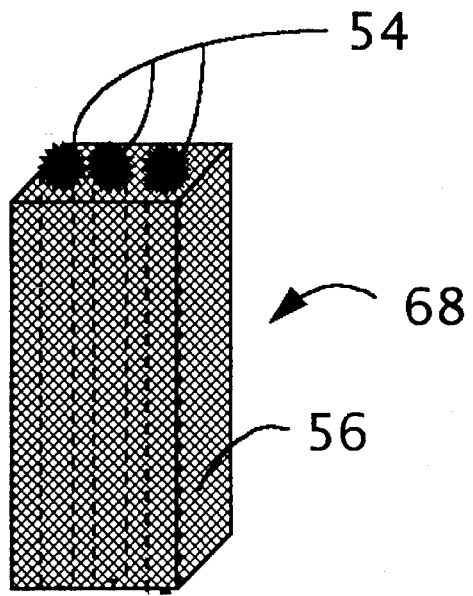
Figure 5A:
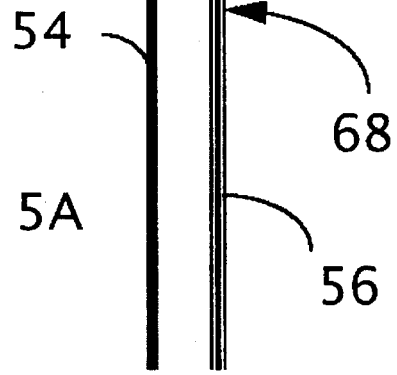

In FIG. 5A, there is illustrated an enlarged cross sectional view of a pseudo bipolar carbon fiber electrode in which a portion of the carbon fibers are coated with a lithium salt of a metal oxide coating.

In FIG. 5B, there is illustrated an enlarged cross sectional view of the metal oxide coated portion of the pseudo bipolar electrode of FIG. 5, when viewed along cross-sectional lines 5B—5B.

Figure 6:
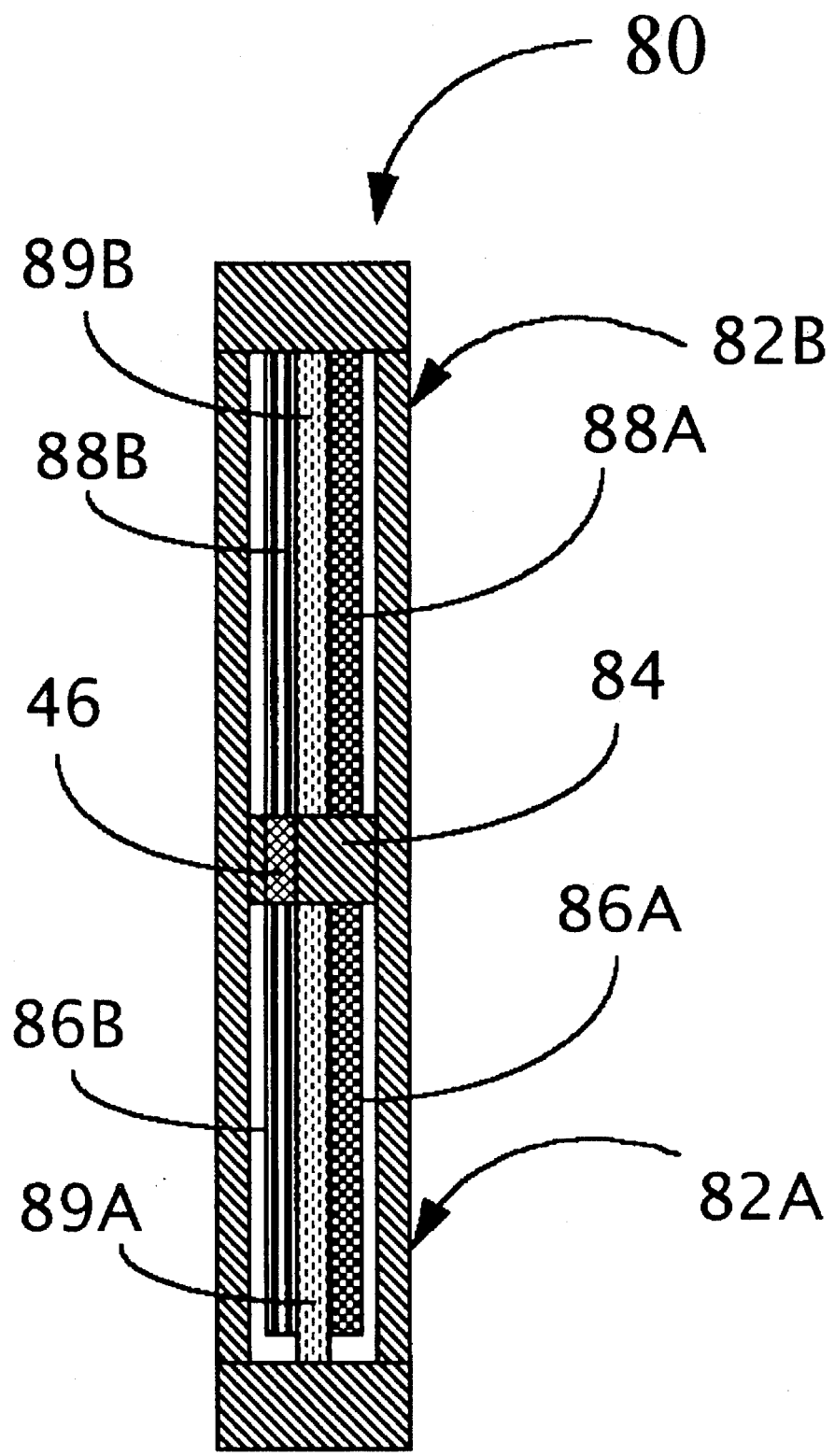

In FIG. 6 there is illustrated a planar cross-sectional end view of a stacked battery assembly, i.e. in which one battery is stacked upon a second battery, with a bipolar electrode extending from a terminal cell in said one battery into a terminal cell of the second battery.

DETAILED DESCRIPTION OF THE INVENTION

Figure 1:
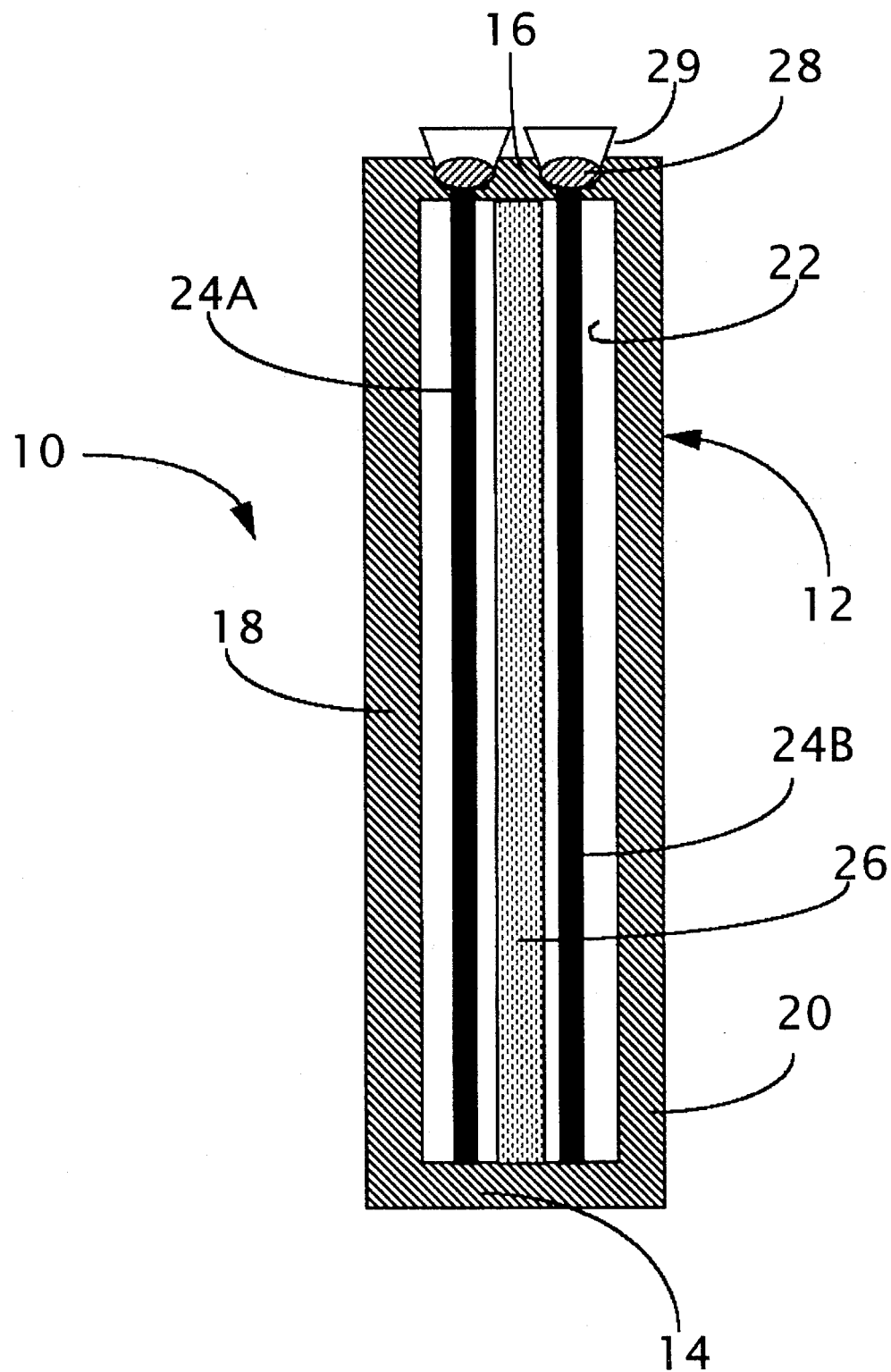

In accordance with one embodiment of the present invention, as particularly illustrated in FIG. 1, there is provided a secondary battery 10 comprising a housing 12 having a generally rectangular or prismatic configuration. It will be apparent that the housing can have any other desired shape, such as a generally planar board where the length, width and thickness can be adjusted to a particular end use and to accommodate any desired number of cells. Accordingly, the battery of the invention can be constructed of any other symmetrical or non-symmetrical configuration. For example, the housing of the battery can consist of an air and water vapor impervious polymer or a metal/plastic laminate that can be molded or pressed into any desired shape to form a housing which could then be inserted into or form the roof, door, or floor panel of an automobile, the wall or panel of a portable computer, etc. Moreover, the battery per se can be in the form of a flexible container or pouch that can be contained in a garment or that can be used for medical applications such as a light weight power unit for a Holter Monitor (an EKG monitoring device), a portable insulin pump, an in vivo portable defibrillator unit, i.e. TENS (Trans Electro Neuro Stimulator), etc.

The battery housing 12 consists of a bottom wall 14 and a top wall 16, a pair of side walls 18 and 20, and a pair of end walls (not illustrated) connecting the top and bottom walls to form an internal chamber 22. A pair of generally planar electrodes 24A and 24B, constructed in accordance with the teachings of the present invention, are positioned in the chamber in a facing relationship. An electrically non-conductive, ion permeable planar, sheet like electrode separator 26 is positioned between the electrodes to prevent short circuiting between the electrodes while permitting ions to travel between the electrodes. It will be understood by persons skilled in the art that a planar sheet like separator that is electrically non-conductive is but one form of preventing contact and short circuiting between the electrodes. It is contemplated that the electrodes can be prevented from contacting each other by means such as electrically non-conductive spacers that extend between the electrodes. For example, the spacers could take the form of polymeric beads that are applied to the facing surface or surfaces of the electrodes and that are spaced at distances from each other sufficient to prevent contact between the electrodes. Instead of beads, spacing between the electrodes can also be obtained by means such as narrow strips of an electrically non-conductive polymeric material, or the like.

Although both of the electrodes are preferably made of the flexible carbon fibers of the invention, it is within the scope of the invention to construct the positive electrode, i.e. the cathode, of any other electrically conductive material such as, for example, a metal or metal alloy, provided that the metal is resistant to the corrosive effect of the electrolyte.

The electrodes 24A and 24B are provided on at least one edge (when the electrodes are generally rectangular in shape) of the electrode body with a current or electron collector such as is illustrated, for example in U.S. Pat. No. 4,830,938 to McCullough et al, or as illustrated and described in U.S. Pat. No. 4,631,118, issued on Dec. 23, 1986 to F. P. McCullough et al, the subject matter of both of these patents being incorporated herein in their entirety by reference. Other methods beyond the scope of these above two references for depositing a copper, nickel or other conductive metal current collector on the edge of the electrode such as by electroless plating, plasma or vacuum vapor deposition, and the like, can also be employed.

In a preferred manner, a current collector 28 is provided to extend along at least one edge of each planar electrode 24A and 24B. In the embodiment illustrated, the current collector extends along the top edge of the electrode although it will be apparent that the current collector can also extend along a side or bottom edge of the electrode, or along all of the edges of the electrode to form a frame like configuration. An electrically conductive terminal 29 is connected to the current collector at any suitable position along the length of the current collector such as, for example, at one end or at a mid-portion thereof. The current collector and, preferably, at least a portion of the terminal is embedded within the housing wall 16 and to an extent sufficient so that the electrolyte does not come into contact with the current collector or terminal. Thus, only the carbon fiber electrode is exposed to the electrolyte. This design is preferable to the design illustrated in U.S. Pat. No. 4,830,938 to McCullough et al where the current collector is positioned within the electrolyte of the cell and thus must be encapsulated with a polymeric material to protect the current collector from the corrosive effect of the electrolyte. It is also contemplated and within the scope of the present invention, that an edge of the electrode is embedded within and extends through the polymeric portion of a laminate housing wall so that the current collector can then be attached to the projecting edge portion of the electrode. The current collector can then be electrically connected to an outer water impervious metal sheet or foil to complete the assembly of the battery. It will be understood that if the housing wall is constructed of a plastic/metal/plastic laminate, that care must be taken so that the electrode portion that extends through the housing wall does not come into contact with the metal of the laminate. A simple way of accomplishing this is to provide a suitable small opening in the metal of the laminate through an appropriate sealing gland.

The flexible carbon electrode of the invention is constructed from a multiplicity of carbon fibers that are preferably assembled as a planar sheet, with the fibers oriented in a substantially parallel relationship. The electrodes can also be in the form of an assembly of a multiplicity of fibers in the form of a non-woven web, or a woven or knitted fabric, for example, if it is desired to roll-up a sheet of the web or fabric thereby forming the electrodes into the form of a jelly roll such that the electrodes can be inserted into a cylindrical housing. If the electrode is in the shape of a web formed from a multiplicity of fibers, it is preferable that the fiber strands either be attached to the separator material, or that the fibers of the web are somewhat fused together to present a somewhat porous body with a multiplicity of intersticial openings since this construction lends greater stability to the electrode and also obviates the need for bonding the peripheral edges of the electrode when the electrode is made of a multiplicity of fibers, for example.

Since the charge capacity of a cathode is related to its surface area, it is a preferred embodiment of the invention to construct the cathode of a multiplicity of fibers with a geometric configuration designed to present a maximum surface area to the negative ions of the electrolyte that migrate to the fiber surfaces of the cathode. In this regard, it is also desirable to construct the carbon fibers of a relatively small diameter of from about 1 to about 15 microns, preferably from about 4 to about 8 microns, since the diameter of the fibers is generally proportional to their surface area. Specifically, two fibers of a generally round or circular cross-section and having a diameter of 5 microns will present about 4 times the surface area of a single fiber having a diameter of 10 microns.

The carbon fiber employed for the electrodes of the invention has a surface area of from greater than 1 to about 150 $m^2/g$, preferably greater than 5 $m^2/g$, and more preferably from about 10 to about 50 $m^2/g$, so long as the method employed to increase the surface area preserves the surface structural integrity and high electrical conductivity (low specific resistivity) of the fiber. The surface area of the non-circular carbon fibers that can be used for the electrodes of the invention can be substantially higher compared to the much lower surface areas employed with the circular carbon or graphitic electrodes taught in the prior art that generally prefer a surface area that is less than one would associate with activated absorptive carbon (which has a surface area of from 50 to 2000 $m^2/g$). Activated absorptive carbon is known to have a very porous and pitted surface and one that is not essentially contiguous.

The reason for the use of carbon fibers of the invention having a contiguous surface and yet one that has a relatively high surface area lies in the fact that the cross-sectional geometry is changed from the typical generally circular cross-section of the prior art to the hereinbefore described non-circular cross-section which increases the surface area of the fiber for a given diameter while preserving the surface structural integrity characteristics which provide for good electrical conductivity. Beneficially, the higher surface area provides a substantial increase in the storage capacity and performance of the storage device.

In a preferred embodiment, the housing is constructed of a plastic/metal/plastic laminate in which the interior plastic, i.e. polymeric, layer of the housing is electrically non-conductive and chemically resistant or inert to the electrolyte. It will be understood that it is not essential to select a polymeric material that is electrically non-conductive for the interior surface of the housing since it is also possible to electrically isolate the electrodes from an electrically conductive interior housing surface such as, for example, by placing the electrodes at a distance from the interior surface sufficient to prevent contact therewith. Alternatively, spacing members can be placed at intervals between the electrodes and the interior housing wall to assure that no contact occurs between the wall and the electrodes. It is preferred, however, to construct the housing of a metal/plastic or plastic/metal/plastic laminate since laminates are particularly suitable as housings for secondary storage devices because of their light weight, formability, impact resistance, electrical characteristics and gas and water vapor impermeability. More specifically, in a plastic/metal/plastic laminate structure, the outer plastic, i.e. polymeric, layer can be made of a tough shock absorbing polymeric material that would also serve as a protective layer for the intermediate gas and vapor impervious metal layer. The metal layer can be formed of any metal although it is preferred to use a relatively thin aluminum, magnesium (or magnesium or aluminum alloys) or copper foil. The inner, electrically non-conductive, layer can serve as a protective layer for the intermediate metal layer to prevent contact of the metal layer with the electrolyte and thus prevent corrosion of the metal layer. Construction materials and methods of construction for a battery housing are described in U.S. Pat. No. 4,830,938 to McCullough et al.

The housing contains an electrolyte. The electrolyte employed in the secondary battery of the invention is a mixture of an ionizable salt dissolved in a non aqueous, liquid or paste. Alternatively, the electrolyte per se can be ionizable to some extent as well as any nonconducting solid through which ions will be transported under the influence of an electrical charge and discharge as more fully explained in U.S. Pat. No. 4,830,938 to McCullough et al. The electrolyte preferably consists of a non-conductive, chemically stable, nonaqueous solvent for the ionizable salt or salts, wherein the ionizable salt is dissolved in the solvent. One can employ as the solvent those compounds that are generally known in the art such as, for example, compounds having oxygen, sulfur, and/or nitrogen atoms bound to carbon atoms in an electrochemically non-reactive state. Preferably, one can employ nitriles such as acetonitrile; amides, such as dimethyl formamide; ethers, such as tetrahydrofuran; sulfur compounds, such as dimethyl sulfite, and other compounds such as propylene carbonate, ethylene carbonate, or various blends of the above mentioned solvents. It is, of course, to be understood that the solvent itself can be ionizable under conditions of use sufficient to provide the necessary ions in the solvent. Thus, the ionizable salt must be at least partially soluble and ionizable either when it is dissolved and goes into solution into the solvent or upon liquefaction. While it is to be understood that slightly soluble salts are operable, it will be recognized that the rate of electrical charging and discharging can be adversely affected by the low concentrations of such salts in solution.

Ionizable salts which can be employed in the practice of the invention are those taught in the prior art and include salts of the more active metals, such as, for example, the alkali metal salts, preferably lithium, sodium or potassium, or mixtures thereof containing stable anions such as perchlorate ($ClO_4^-$), ($CF_3SO_3^-$), tetrafluoroborate ($BF_4^-$), hexafluoroarsenate ($AsF_6^-$), hexafluoroantimonate ($SbF_6^-$), hexafluorophosphate ($PF_6^-$), and the like.

Figure 2A:
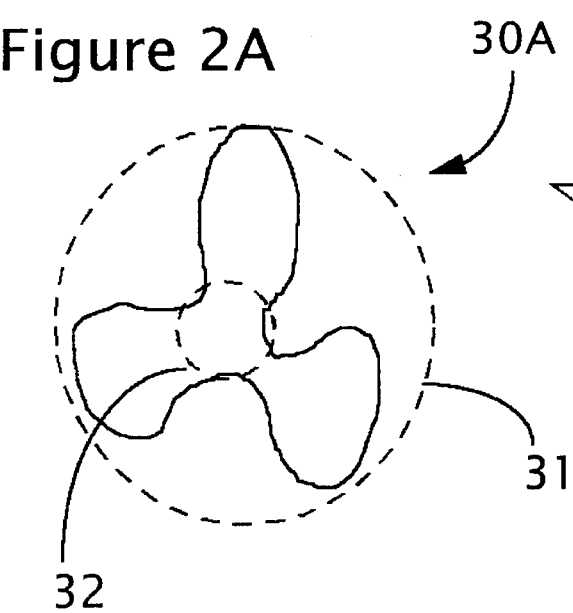
FIGS. 2A, 2B and 2C are cross sectional views of carbon fibers having a generally non-circular, cross-sectional configuration.

It is preferred that the electrolyte (solvent and salt) is substantially water-free, that is, contains less than about 20 ppm of water, preferably less than 10 ppm water, and more preferably less than 1 ppm. Of course, if the electrolyte contains more than the desired amount of water, it can be dried as for example, over an activated zeolite molecular sieve. Such a drying agent can also be introduced into the finished battery to ensure that the level of water does not exceed the ability of the cathode to neutralize the free hydroxyl ions that may be present in the electrolyte. The electrolyte should also be such as to permit ions (anions and cations) of the ionizable salt to move freely through the solvent as the electrical potential of charge and discharge move the ions to and from their respective poles (electrodes). With particular reference to FIG. 2, there are illustrated, in cross-section, three embodiments of carbon fibers having a generally non-circular configurations such as can be usefully employed for the electrodes of the invention. With particular reference to FIG. 2A, there is illustrated a fiber 30A having a generally tri-lobal cross-sectional shape which presents an enlarged surface area, for a given outer nominal fiber diameter, as compared to a similar fiber of a circular cross-sectional shape. It will be understood here that the nominal diameter of a generally circular cross-sectional fiber is the distance extending from any point on the fiber surface through the center of the fiber to a point located on the opposite outer surface of the fiber and thus is also its "effective" diameter. In the tri-lobal cross-sectional fiber illustrated in FIG. 2A, for example, the outer nominal diameter of the fiber is shown by dotted line 31 while the "effective" diameter of the fiber is shown by dotted line 32. Thus, in the case of a tri-lobal fiber the nominal diameter is equivalent to the nominal diameter of a generally circular cross-sectional fiber, but its effective diameter is substantially smaller and of the size of the circle shown by dotted line 32. The enlarged surface area provided by the tri-lobal fiber thus allows for the presence of a substantially higher ion density, i.e. to the ions of the electrolyte, at the surface interface of the fiber/electrolyte as compared to a fiber having a generally circular cross-section. The smaller effective diameter of the tri-lobal fiber also give the fiber greater flexibility as is represented by a bending strain value of less than 50% which is advantageous in forming a relatively sharp bend in a bipolar electrode configuration as the electrode passes through the separator wall of one cell into an adjacent cell. It is also advantageous where the electrode is wound into a jelly roll type of configuration for insertion into a cylindrical housing. In such a configuration, the inner windings of the jelly roll are particularly subject to tensile stress on the carbon fibers in view of the sharp bends that are imparted to the electrode.

Figure 2B:
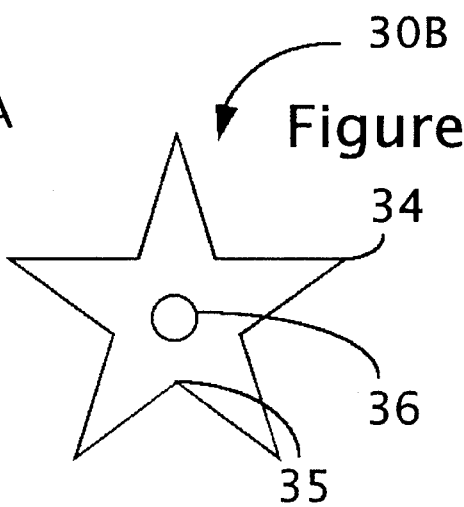

In another embodiment illustrated in FIG. 2B, the fiber 30B has a cross-sectional shape of a star which also presents an enlarged surface area as compared to a fiber having a circular cross-section. As previously indicated, it will be understood that, during extrusion of the fiber, the star shape will not be as sharply defined as illustrated in the drawing but will be somewhat obliterated such that the peaks 34 and the valleys 35 of the star will be more rounded in shape. This being entirely due to the fact that the heated polymer, during extrusion, will continue to flow so that the ends of the star become somewhat rounded in shape. Optionally, the fiber can also be provided with a central passageway 36 extending along the length of the fiber. Since most of the electron activity is concentrated on the outer peripheral portion of the fiber, a hollow or generally tubular fiber represents a saving in the amount of polymeric material used without any sacrifice in performance. Additionally, the interior passageway renders the fiber more flexible.

Figure 2C:
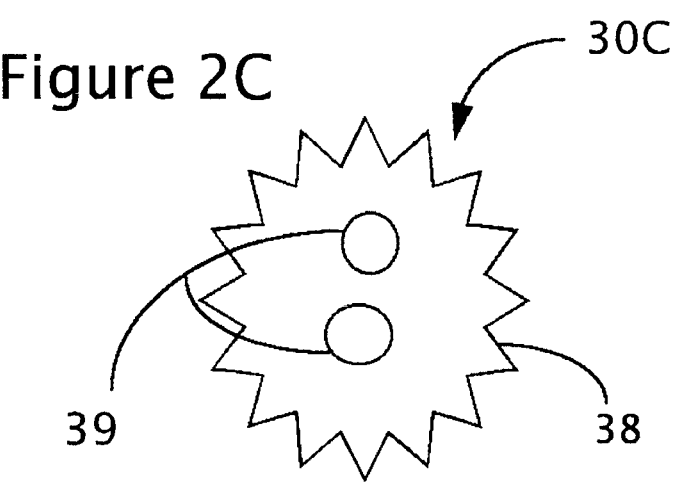

In a further embodiment illustrated in FIG. 2C, the fiber 30C has a cross-sectional shape more likened to a toothed wheel or a generally circular in cross-section fiber that is provided with a multiplicity of serrations 38 on its outer surface. For the same reason as stated with regard to FIG. 2B, the fiber of FIG. 2C can also be provided with one or more passageways 39 extending along the length of the fiber. As shown, two passageways are located near the center of the fiber although any number of micron size passages can be incorporated into the fiber.

It will be understood that the non-circular cross-sectional fiber configurations illustrated herein are representative of only a few types of cross-sectional configurations and that the fiber can be made in any desired cross-sectional shape during its manufacture and that such shape is limited only by limitations of making an extrusion die for extrusion of a polymeric precursor material through the die, the composition of the polymer, temperature, etc. The number of lobes or points of a star, or the like, configuration of a fiber is limited only by the fact that the heat softened polymer that is extruded from a die has a tendency to flow and thereby obliterate the cross-sectional shape to revert to a more nearly circular cross-sectional shape. For other cross-sectional shapes of polymeric fibers, reference is made to "Modern Textiles" by D. S. Lyle, particularly pages 52 and 53.

A preferred electrode structure consists of an assembly of a multiplicity of carbon fibers that are arranged in the form of a generally planar sheet. The cross-sectional shape of the fiber is geometrically altered to present a larger surface area to the electrolyte as compared to carbon fibers having a generally circular cross-section. Preferably, the electrically conductive carbon fibers of the electrode should have the following physical property criteria:

(1A) A Young's modulus of from greater than 1 MM psi (6.9 GPa) up to about 55 MM psi (511 GPa). A modulus of 1,000,000 psi being equivalent to 1 MM psi.

(2A) An aspect ratio of greater than 100:1. The aspect ratio is defined herein as the length to diameter l/d ratio of a flexible carbon fiber, and a fiber diameter of from about 1 to about 15 microns, preferably from about 4 to 8 microns.

(3A) A surface area with respect to the carbon fiber of greater than 1 $m^2/g$ and up to 150 $cm^2/g$, preferably greater than 5 $m^2/g$ and, more preferably from about 10 to about 50 $m^2/g$. It will be understood that it is possible to use carbon fibers that have a surface area as low as 0.1 $m^2/g$, but that such a low surface area will not provide the optimum in terms of the storage capacity or coulometric efficiency.

(4A) The carbon fibers of the invention should have a carbon content of from about 85% to 99% by weight, preferably from about 95 to about 98% by weight.

(5A) The carbon fibers of the invention should have a specific resistivity of less than 0.5 ohm-cm, preferably from about 0.0005 to less than 0.5 ohm-cm.

(6A) The carbon fibers of the invention have a bending strain value of from greater than 0.01% to less than 50%, preferably less than 30%.

(7A) The carbon fibers of the invention have a substantially contiguous surface area that is substantially free of pits and pores, wherein the surface has micropores representing less than 5% of the total surface area of the fiber.

The performance criteria of the secondary energy storage devices of the invention can be summarized as follows:

(1B) The structural and mechanical integrity of the flexible carbon fibers, in whatever fabricated form they may be when assembled as an electrode, must be such that the electrode does not require the presence of a support such as a pressure plate (face films or mesh) to maintain the carbon fibers in the desired sheet or plate like shapes preferably throughout at least 600 charge/discharge cycles. More preferably, the carbon fibers should be capable of sustaining more than 1000 electrical charge and discharge cycles without any appreciable damage due to spalling or flaking. Most preferably, no appreciable damage should occur after more than 1500 electrical charge and discharge cycles.

(2B) The carbon fibers of the electrode should be capable of sustaining deep electrical discharges of greater than 80 percent of its electrical charge capacity for at least 600 cycles of electrical charge and discharge, and preferably greater than 90% for more than 800 electrical charge and discharge cycles.

(3B) The carbon electrodes should be capable of maintaining a discharge capacity of a greater than 600 coulombs per total gram of carbon electrode material in both electrodes.

(4B) Sufficient structural integrity of the electrode to retain its shape when in a generally planar configuration and without any support, i.e. other than the current collector associated with the terminal electrodes. It should therefor be possible to construct the electrodes of the invention of a size (in terms of nominal facial dimension) as small as 1 $in^2$ (6.45 $cm^2$) and as large as 144 $in^2$ (930 $cm^2$) or even larger. The edges of the pseudo bipolar electrodes are preferably coated with a polymeric material to prevent the edges from fraying. Suitable polymeric materials that can be used are polyethylene, polypropylene, PVC or Derikane™ brand curable vinyl ester or epoxy resin coating compositions, or the like.

(5B) The coulometric (coulombic) efficiency of cycling of an energy storage device comprised of the carbon fiber electrode of the invention should always be greater than 90 percent, preferably greater than 95 percent and most preferably about 99 percent or greater.

(6B) The secondary electrical energy storage device of the invention should be substantially free of water but should be capable of operating with a water content of up to 20 ppm without any reduction in life and without any need for disassembling, drying and reassembling of the storage device. Preferably, the storage device should contain less than about 10 ppm water, most preferably less than 1 ppm.

(7B) The carbon fiber electrodes, in a secondary storage device, having the physical properties herein before described should, at the very least, be capable of sustaining electrical discharge and recharge of more than 600 cycles at a discharge capacity of greater than 600 coulombs per gram of carbon material of both electrodes and at a coulometric efficiency of greater than 90% without any substantial irreversible change in dimensions (dimensional change of less than about 5%).

The flexible, generally non-circular carbon fibers of the invention are obtained by heating a stabilized polymeric precursor article, e.g. a generally planar sheet of a multiplicity of fibers in a non-oxidizing atmosphere to a temperature above 950° C. and for a time sufficient to carbonize the fibers until electrically conductive and so as to provide the fibers with the physical property characteristics hereinbefore described under paragraphs (1A) through (7A). The polymeric precursor fibers should have some degree of surface skeletal orientation, i.e., the fibers either have substantial concentrations of oriented benzenoid structural moieties or moieties which are capable of conversion, on heating, to benzenoid or equivalent skeletal orientation at or near the surface because of the skeletal orientation of the starting material. It is an important feature of the present invention that the surface of the fiber is contiguous and remains substantially free of pores, crevices or pits so as to maintain the strength and structural integrity of the electrode to repeated cycling.

Exemplary of preferred precursor materials which exhibit such surface skeletal orientation on heating are assemblies of multi- or monofilament strands or fibers prepared from polyacrylonitrile. Such multi- or monofilament fibers are readily assembled into a generally planar sheet like product from a tow of a multiplicity of individual, substantially parallel carbon fibers. A preferred method of fabrication of electrodes is to use heavy tows of 320,000 fibers, or more, in which the fibers are substantially parallel and in the form of a thin, planar sheet-like configuration. In the case of tows containing a smaller number of fibers, e.g. up to 40,000 fibers, the smaller tows can be fabricated into a knitted or woven cloth-like product. One technique for producing a cloth from fibers or a fiber tow is disclosed in U.S. Pat. No. 4,005,183.

Advantageously, the carbonaceous precursor material can be in the form of a continuous or non-continuous fiber which can be made into assemblies such as a fiber tow, i.e. a heavy tow of 320,000 or more fibers in the form of a relatively thin, planar sheet, or a woven or knitted fabric, a non-woven web, felt or board. However, much less acceptable results are obtained when yarns, made from short fibers (about 1 to 10 cm long), are woven or knitted into a cloth-like product (provided such short fibers still have, when heat treated, the required physical properties hereinbefore mentioned under (1A) through (7A). While it is advantageous to form the precursor polymeric material, preferably in a stabilized state (such as is obtained by oxidation), into the desired form (knit, woven, sheet or felt) prior to carbonization, such conversion to the desired form can be also be done after carbonization although it is preferred that the carbon fiber sheet be initially formed from a fibrous polymeric precursor sheet, cloth, or the like.

The preceding description with regard to the electrical energy storage device illustrated in FIG. 1, the fiber embodiments of FIG. 2, and the physical characteristics described under items (1A) through (7A) are generally applicable to the following embodiments of energy storage devices illustrated in FIGS. 3 to 6.

With particular reference to FIG. 3, there is illustrated a bipolar electrical energy storage device 40 comprising a generally rectangular housing 12 which is provided with an internal cell separator wall 41 dividing the chamber into a pair of cells 42A and 42B which form, in effect, a pair of terminal cells. In a more preferred embodiment, a plurality of intermediate cells (not illustrated) can be provided between the pair of terminal cells to form a battery stack. The number of cells being limited only by the particular use for which the battery is intended and the desired potential (battery stack voltage). The separator wall 41 can be constructed of the same material as the housing wall or of any other suitable polymeric material that is compatible with the electrolyte system. Thus, the separator wall 41 can be made of a monolithic polymeric material rather than a laminate of a plastic/metal/plastic, for example. Each of the terminal cells 42A and 42B contains a terminal electrode 24A and 24B. A bipolar electrode 44, preferably constructed of a unitary planar sheet like structure and formed from a multiplicity of flexible carbon fibers, is positioned in the housing such that a mid portion 45 thereof is sealingly embedded in or potted within a suitable potting resin 46 in the separator wall 41 and such that one portion 44A of the bipolar electrode 44 extends into the terminal cell 42A and another portion 44B extends into the terminal cell 42B. In an alternative embodiment, the bipolar electrode can be embedded at a midportion thereof within a wall of the housing itself, e.g. housing wall 16, with the portions 44A and 44B extending from the housing wall into the adjacent terminal cells 42A and 42B, respectively. When the separator wall 41 is constructed of the same material as the housing walls, the housing and separator wall can be molded of a unitary structure, provided that the housing wall is still sufficiently impervious to the migration of water molecules through the wall.

A major problem with batteries employing bipolar carbon fiber electrodes, as disclosed in U.S. Pat. No. 4,830,938 to F. P. McCullough et al, has been the relative stiffness of the carbon fibers and electrode which prevented the formation of a relatively sharp bend of the electrode at the midportion thereof which is embedded in or potted in the separator wall. Accordingly, to prevent excessive breakage of the stiff carbon fibers that have heretofore been employed, it was necessary to provide the midportion passing through the separator wall with a bend of a relatively large radius, i.e. having a bending stain value of less than 0.01%. The present invention now overcomes this deficiency and provides for a substantial improvement in flexibility of the bipolar electrode. As illustrated in FIG. 3, the bipolar electrode exhibits a relatively sharp bend at the point where the midportion of the electrode passes through the separator wall 41. An important consideration in the manufacture of a battery utilizing the bipolar electrode of the invention lies in the flexible nature of the fibers having a bending strain value of less than 50%, but greater than 0.01%, preferably from 0.1 to 30%, and more preferably from 0.1 to about 10%. This allows the electrode and the fibers to be bent at a relatively sharp angle so that the electrode portions can be positioned adjacent to the planar surfaces of the separator wall 41. This, in turn, allows for the construction of a battery in which the cells, especially batteries with more than 3 cells, can be compressed with essentially no space being wasted between the bipolar electrode portions and other components of the battery. The close proximity of the battery components with respect to each other most importantly provides for a short path of travel for the electrons between the electrodes and, correspondingly, maximum efficiency in energy storage. While the bipolar electrode 44 is shown as a single unitary component having portions of equal length extending into adjacent terminal cells 42A and 42B, it is preferred that one or both portions of the bipolar electrode be constructed of a length such that one or both electrode portions can be folded upon itself to increase the total electrode area. The extent to which an electrode portion can be folded upon itself is only limited by the available volume of a cell compartment. In a preferred embodiment of the invention, the cathode (positive) portion of the bipolar electrode is folded upon itself one or more times to present a greater surface area to the migrating anions of the electrolyte during charge and discharge of the storage device. An anode (negative) portion of a smaller size being sufficient to accept a corresponding number of cations. It has generally been observed that a cathode that is at least twice as large as a given anode, i.e. in a ratio of greater than about 2:1, is most effective in terms of its storage capacity and coulombic efficiency. Here again, the flexible nature of the carbon fibers and electrode allows for a folding over of one or both electrode portions without breakage of the carbon fibers.

Separators 32A and 32B preferably have a low ionic resistance, are foraminous, ion permeable, and electrically non-conductive and are positioned between each terminal electrode 24A and 24B and the portions 44A and 44B of the bipolar electrode 44 extending into each terminal cell to prevent electrical contact and short circuiting between the electrodes. The separator can be in the form of a web or mat like material, e.g. fiberglass mats, polypropylene scrim or foraminous film, and the like, as disclosed in U.S. Pat. No. 4,865,931 to McCullough et al. For example, a very thin, as little as 7 fibers thick, non-woven planar mat can be used as the separator, since no protection to dendritic puncture associated with secondary batteries having metal anodes is necessary for the device of this invention.

In accordance with a more preferred embodiment of the invention, a rechargeable battery can be prepared containing more than two cells (not illustrated) very similar to the battery illustrated in FIG. 3. The only difference between the cell of FIG. 3 and the preferred embodiment being in the provision of one or more intermediate cells. Thus, the terminal cells each contain a terminal electrode made from the aforedescribed flexible carbon fibers and the intermediate cells containing bipolar electrodes as previously described and shared with adjacent cells. An intermediate cell would therefor contain two electrode portions from a pair of bipolar electrodes extending into the intermediate cell through the separator walls from adjacent cells. An embodiment of a battery containing two bipolar electrodes and one intermediate cell is illustrated in the single figure of U.S. Pat. No. 4,830,938, to McCullough et al.

In the construction of the secondary electrical energy storage device of the invention, conventional porous separators of fiberglass, polymeric materials including membranes, or composites of polymeric materials, can be employed to separate the positive and the negative electrodes from each other to prevent short circuiting between the electrodes. Preferably, the separator is a non-woven, porous, non-conductive material such as a melt blown or spun bonded polypropylene sheet or web, or a functionalized membrane provided that it has the desired degree of porosity and yet a sufficient tortuous path to prevent the carbon fibers of the electrode from penetrating through it, thus preventing electrical shorting. The porous separators also beneficially act as stiffeners or supports for the electrodes during assembly.

Energy storage devices which employ housings that are gas and water vapor impermeable and that are made of materials that are compatible with non-aqueous electrolytes are generally known in the art. Materials that are chemically compatible as a housing material include polyvinyl chloride, polyethylene, polypropylene, polytrifluoroethylene and related perfluorinated polymers, instant set polymers (ISP) which are formed from a rapidly solidifying reactive urethane mixture, the aramids, a metal clad with a non-conductive polymeric material such as an epoxy e.g. DER® 331 or with a Derakane™ brand of a curable vinyl ester epoxy resin, a Zetabon™ brand of a plastic/metal/plastic laminate and/or glass or a metal oxide, fluoride, or the like. Housing materials found not to be suitable in the preferred propylene carbonate system include acrylics, polycarbonate and nylon. Acrylic polymers have a tendency to craze, polycarbonate polymers craze and become extremely brittle, while nylon is chemically reactive.

U.S. Pat. No 4,830,938 to McCullough et al reports that the housing material must offer an absolute barrier against the transmission of water vapor from the external environment of the housing but that presently there is no known thermoplastic material alone which offers this absolute barrier against moisture at a thickness which would be useful for a battery housing. At present, only metals, for example aluminum, offer an absolute barrier against moisture or water vapor transmission at foil thickness of greater than 0.0015 in. (0.038 mm). It has also been shown that when laminated to other materials, aluminum foil as thin as 0.00035 in. (0.009 mm) can provide adequate protection against water vapor transmission. Suitable housings made of a metal-plastic laminate, CED-epoxy-coated metal (cathodic electro deposited), or metal with an internal liner of plastic or glass presently satisfies the requirements for both chemical compatibility and moisture barrier ability. Most of the batteries built to date have been tested in either a dry box having a $H_2O$ level of less than 5 ppm, a glass cell or a double walled housing with the space between the walls filled with an activated molecular sieve.

The terminal electrodes include an electron collector that is conductively associated with at least one edge or a portion of the peripheral edge of the carbon electrode. The edge is preferably either further protected by a material to insulate the collector and to protect the collector from contact with the electrolyte and its ions or placed in the body of the case material, or sealed directly through the liner of the case material. When the electrode is constructed in other shapes such as in the form of a spiral or tubular bundle of fibers, the ends of the bundle are provided with a current collector.

While copper has been used as a current collector material, any electro-conductive metal or alloy can be employed, such as, for example, nickel, silver, gold, platinum, cobalt, palladium, and alloys thereof. Likewise, while electrodeposition has been used in bonding a metal or metal alloy to the carbon material, other coating techniques (including melt applications) or electroless deposition can be employed as long as the edges or ends of the electrode, including a majority of the fiber ends are wetted by the metal to an extent sufficient to provide a substantially low-resistant electrical contact.

Current collectors made from a non-noble metal, such as copper, nickel, silver or alloys of such metals can also be used but must be protected from the electrolyte. Such metals are therefore preferably coated with a synthetic resinous material or an oxide, fluoride, or the like, which will not be attacked by the electrolyte or undergo any significant degradation at the operating conditions of a cell.

In the cell of the invention, it is also possible to use inductive coils imbedded in the housing material, connected to the terminal electrodes to charge the storage device. An additional advantage of the present design is that the cell is reversible, that is to say, the cell can be connected in a positive-negative mode and on negative can be reversed to a negative-positive mode without damage to the electrodes.

The preceding discussion with regard to the electrical energy storage devices and fibers illustrated in FIGS. 1 to 3 is applicable to energy storage devices of a generally cylindrical shape and containing at least a pair of flexible carbon electrodes that are rolled up into a spiral or jelly roll type configuration or that are positioned in a concentric relationship within the cylindrical housing Energy storage devices of such construction are illustrated in FIGS. 4, 5 and 7 of copending application by F. P. McCullough, Ser. No. 08/280, 708, filed Jul. 7, 1994, the subject matter of which is incorporated in its entirety herein by reference.

It is also within the scope of the invention that electrodes in the form of a planar film, sheet, or the like, can be rolled up without a porous separator between the electrodes by using a plurality of fixed non-conductive spacers (not illustrated) and with the opposed edges of each of the rolled up electrodes connected to a current collector. The space between the electrodes and the separator is filled with an electrolyte in liquid or paste form.

In the planar sectional side view of FIG. 4, there is illustrated another embodiment of a bipolar electrical energy storage device such as a rechargeable battery. The battery, illustrated by reference number 50, comprises a housing 12 having a top wall 16, end walls 18 and 20, and a bottom wall 14 (the side walls are not shown). It will be apparent that the battery can stand on its side so that the top and bottom walls 16 and 14 become the side walls. The interior chamber of the housing 12 is divided by a pair of equidistantly spaced separator walls 51A and 51B forming a pair of terminal or end cells 52A and 52B and an intermediate cell 52C. A pair of planar sheet like bipolar electrodes 54A and 54B are positioned in the interior chamber in a facing relationship. Each bipolar electrode 54A and 54B passes through a separator wall 51B and 51A, respectively, so that a portion of each bipolar electrode occupies the space within each of the terminal cells 52A and 52B, respectively. Each electrode is sealingly embedded in a potting resin 54 in their respective separator wall or, alternatively, is embedded within the separator wall itself. An electrically non-conductive, ion permeable, planar sheet like separator 55 is positioned between the electrodes and can be either in the form of a separate sheet for each cell or in the form of a single sheet passing through the separator walls 51A and 51B and embedded in a potting resin or embedded within the material of the separator walls itself. The cells contain an electrolyte and thus form a battery with said pair of terminal cells 52A and 52B that are separated by the intermediate cell 52C.

One end of each terminal electrode 56A and 56B is provided along an edge thereof with an electron collector 28 and a terminal 29 positioned at a desired location along the length of the electron collector. Preferably, the electron collector is embedded within a housing wall so that it does not come into contact with the electrolyte, obviating the necessity of encapsulating the electron collector and terminal in a protective coating.

The construction of this cell is similar to the bipolar cell illustrated in FIG. 3, except that the electrodes 54A and 54B are planar and do not contain any sharp bends. Accordingly, the electrodes can be formed of continuous lengths of carbon fibers that can be cut to any desired length and that can be assembled so as to form a battery of any desired length that are easily assembled into a housing having any desired number of cells.

The carbon fiber electrodes of the invention can also be readily adapted to other battery systems, particularly lithium ion cells which have been developed in recent years. In the lithium ion cell, the metallic lithium electrode has been replaced by an anode which is based on a carbonaceous material which forms intercalation compounds with the lithium ions. The initial source of the lithium ions is the cathode material which can be a lithium metal oxide (lithiated metal oxide) such as, for example $LiCoO_2$; $LiNiO_2$ and $LiMn_2O_4$. There is never any metallic lithium in the lithium ion cell during normal operation and, accordingly, lithium ion cells are inherently safer than cells containing metallic lithium. During charge and discharge, the lithium ions are swinging through an organic non-aqueous electrolyte between the electrodes as electrical energy is introduced or withdrawn through an external electric circuit. More specifically, during the charge cycle the metal oxide gives up an electron to the carbonaceous material electrode, while lithium ions move from the cathode to the carbonaceous material electrode to form $C^-Li^+$. Currently chopped high modulus pitch fibers that are held together with a binder are used to achieve electrode flexibility. While this allows some freedom in electrode shape fabrication it does so at the expense of giving the electrode a high internal resistance due to the high contact resistance at each contact between each of the chopped carbon fibers. Using the continuous flexible carbon fibers of the invention provides both the freedom of making the electrode into a variety of different shaped configurations, while lowering the internal resistance of the electrode by several orders of magnitude.

With particular reference to FIG. 5, there is illustrated a cross sectional side view of a secondary energy storage device that is structurally identical to the energy storage device illustrated in FIG. 3. However, the storage device of FIG. 5 is specific to a lithium ion cell in which a terminal electrode 62, positioned in terminal cell 64A, comprises a substantially planar electrically conductive collector screen plate or sheet that is provided with a metal oxide coating. The conductive screen 63A can be made of any electrically conductive metal, preferably nickel, but can also be made of carbon or graphite that is coated with a conductive metal. The screen is provided with a coating of a lithium salt of a metal oxide of the empirical formula $Li(MO_2)_n$ in which M is a metal selected from the group consisting of VIIb and VIIIb. The metals are typically selected from the group consisting of Co, Ni and Mn, where n=1 for Co and Ni and n=2 for Mn.

A terminal electrode 66 comprising a multiplicity of the carbon fibers of the invention is positioned in terminal cell 64B. An internal cell separator wall 70 divides the internal chamber of the housing into the pair of terminal cells 64A and 64B. A pseudo bipolar electrode 68 has a midportion 55 thereof embedded in the separator wall itself or, as shown, embedded in a potting resin 71 provided in the separator wall for sealing the pseudo bipolar electrode 68 in the wall and for preventing wicking of the electrolyte from one cell into the adjacent cell. The pseudo bipolar electrode 68 is folded so that portions thereof are positioned in each of the terminal cells to form counter electrodes with the terminal electrodes.

In the enlarged cross-sectional view of the pseudo bipolar electrode 68 illustrated in FIG. 5A, the electrode is formed of a multiplicity of carbon fibers 54 of the invention. A portion of the electrode is provided with a coating 56 of a lithium salt of a metal oxide of the empirical formula $Li(MO_2)_n$ in which M is a metal selected from the group consisting of VIIb and VIIIb. Preferably, the metals are selected from the group consisting of Co, Ni and Mn, where n=1 for Co and Ni and n=2 for Mn. Here again, the metal oxide coating is preferably selected from the group consisting of $CoO_2$; $NiO_2$ and $Mn_2O_4$. An enlarged cross sectional view of a portion of the pseudo bipolar electrode, when viewed along section line 5B—5B is shown in FIG. 5B. It can be seen that the carbon fibers, shown here as having a star shaped cross section, are embedded within the metal oxide coating 56. It will be understood, that the fibers can be arranged to be in a linear array but, more likely, the fibers will be arranged in a more staggered and overlapping array when a tow of such carbon fibers of up to 360,000 fibers is provided. Each of the terminal electrodes is separated from its counter electrode by an electrically non-conductive, ion permeable planar, sheet like electrode separator 32A and 32B, the edge of each terminal electrode is provided with a current collector and a terminal, and the cells are provided with a non aqueous organic electrolyte, all as described in connection with the preceding embodiments illustrated in FIGS. 1, 3 and 4.

It will be readily apparent that the principles of the lithium ion cell with a pseudo bipolar electrode configuration can be readily adapted to the flat electrode cell construction illustrated in FIG. 4. In the battery of FIG. 4, a portion each bipolar electrode would be coated with the lithium salt of the metal oxide so that one of these portions would form a counterelectrode with the carbon fiber electrode, while an uncoated portion of the other bipolar electrode would form the counterelectrode for the terminal electrode that is made of the metal oxide coated metal screen.

In a further embodiment, illustrated in the planar cross sectional end view of FIG. 6, there is shown a battery stack 80 comprising a housing which is subdivided by housing wall 82 forming a pair of stacked battery housings 82A and 82B each of which can contain a plurality of cells. A carbon fiber terminal electrode 86A is positioned in battery housing 82A. The cross-hatching of the terminal electrode is indicative of the fact that the fibers in the electrode are positioned to extend horizontally. Terminal electrode 86A is separated from a bipolar terminal electrode portion 86B by an electrically non-conductive, ion permeable planar, sheet like electrode separator 89A. The vertically extending lines of the bipolar terminal electrode portion 86B are indicative of the fact that the fibers are vertically oriented. The carbon fibers of the electrode portion 86B extend through the housing wall 84 itself, or are potted in a potting resin 46 provided in an opening in the housing wall 84, to seal the fibers in the wall 84, thus forming a terminal bipolar electrode portion 88B in battery housing 82B. The bipolar electrode portions 88A and 88B form a rectangularly shaped bipolar electrode which is oriented in a direction transverse to their terminal counterelectrodes. The bipolar electrode portion 88B is separated from terminal electrode 88A by electrode separator 89B which is of the same structure as separator 89A. It will be apparent that battery housing 82A can contain any number of cells which are electronically connected to battery housing 82B which can contain an equal number of cells. The individual cells are provided with an electrolyte of the same composition as explained in connection with the previous embodiments illustrated in the drawings. In the same manner as explained in connection with the previous embodiments, the terminal electrodes are provided with an electron collector and a terminal, not shown.

It will be apparent that any number of batteries can be stacked vertically or horizontally to form an expanded battery pack of 3 or more batteries following the procedure hereinabove described by utilizing bipolar electrodes as terminal electrodes to form an electronic bridge from one battery to the next. It will also be apparent that a stack of batteries can be employed for lithium ion cells utilizing the pseudo bipolar electrode as described in connection with the electrode of FIGS. 5A and 5B except that the bipolar electrode would not be bent upon itself (as in FIG. 5A) but would be of a substantially linear configuration as illustrated in FIG. 4. The following examples are representative of the embodiments described hereinabove.

EXAMPLE 1

A tow of trilobal acrylic fibers containing approximately 86% acrylonitrile, 13% methacrylate and at least 0.01% of sub-micron impurities, which are not removed by microfiltration, is made by traditional melt spinning techniques using a forming die with trilobal shaped extrusion holes. The tow of acrylic fibers is stretched during extrusion of the fibers to attenuate the fibers and then oxidized in air for 1.5 hrs through an oven in which the temperature is gradually increased from 250° C. to 300° C. followed by carbonization at 1200° C. in a tube furnace under a purged $O_2$ free $N_2$ atmosphere for 10 minutes. The resulting fibers are flexible, have a Young's modulus of 11 MM psi, a nominal fiber diameter of 6.8 microns, an effective fiber diameter of 4.2 microns, a surface area of 18 $m^2/g$, a bending strain of 0.1% and a specific resistivity of 0.035 ohm-cm and an aspect ratio of greater than 10000:1. These fibers are useful as a battery electrode material for secondary batteries and as the conductive component for very light weight, thin, flexible measurement electrodes for a portable EKG monitor.

EXAMPLE 2

A tow of pentalobal sub-acrylic fibers comprising 80% acrylonitrile, 17% vinyl chloride and 3% itaconic acid units is made by traditional melt spinning techniques and has a pentalobal cross-section as shown in FIG. 2A. The tow of acrylic fibers is stretched during extrusion of the fibers to attenuate the fibers and is then oxidized in air for 1.5 hours at a temperature of from 250° to 300° C. followed by carbonization at a temperature of 1100° C. in a tube furnace under a purged $O_2$ free $N_2$ atmosphere for 5 minutes. The resulting fibers are flexible, have a bending strain value of 0.2%, a Young's modulus of 4 MM psi, a nominal fiber diameter of 8.0 microns, an effective fiber diameter of 4 microns, a surface area of 11 $m^2/g$, a specific resistivity 0.045 ohm-cm, and an aspect ratio of greater than 1000:1. These flexible carbon fibers are useful as a battery electrode material for secondary batteries and as the conductive component for very light weight, thin, flexible measurement electrodes for a portable EKG monitor.

EXAMPLE 3

Two secondary batteries, each containing two terminal cells are constructed using the fibers produced in examples 1 and 2, respectively. The batteries are similar in construction to the rectangular battery shown in FIG. 1. The electrodes of each cell consist of thin planar sheets made from the tows of fibers and having a dimension of 4 $in^2$ (25 $cm^2$). A thin copper busbar, forming an electron collector strip, is applied to the fiber ends along one edge of the electrode by dipping the fiber ends into a copper sulfate solution thereby slowly electroplating the copper from the copper sulfate solution onto the fiber ends until a solid collector strip has grown along the edge of the planar electrode sheet. A terminal connector is attached, by soldering to one end of the collector strip. The collector strip is covered with a non-conductive DERAKANE® resin coating. A non-woven polypropylene scrim having a thickness of 180 to 200 micrometer is positioned between the electrode sheets for use as a separator sheet. An electrolyte comprising 20% $LiPF_6$ in propylene carbonate is dried to less than 5 ppm $H_2O$ using highly activated zeolite molecular sieves. The electrodes and separator are dried and assembled in a dry box containing less than 1 ppm water. This assembly is placed into a housing of PVC having a wall thickness of 2 mm. The PVC housing is provided on the outer surface with an aluminum foil having a thickness of 50 microns. The housing is filled with the dried electrolyte and 1.5 g of highly activated zeolite molecular sieves. The housing is then sealed with the collector strips and terminals of each electrode potted in a Derakane™ brand vinyl ester resin seal and protruding through the top of the housing lid. The completed assembly is then removed from the dry box and tested as a battery cell. The cell is electrically charged at a potential of 5.5 volts and discharged to 90% of its charge capacity. The capacity of each cell is approximately 600–700 coulombs per total gram of carbon and each cell has a coulombic efficiency of greater than 99%. The cell is capable of over 800 cycles without loss of capacity or efficiency.

EXAMPLE 4

Two bipolar, two cell, batteries are constructed as shown in FIG. 3. using the two different flexible carbon fibers prepared in examples 1 and 2. The electrolyte and housing material having two compartments are the same as used in Example 3. The total thickness across each bipolar battery is approximately 1 cm. The bipolar electrode, being twice the size of the respective terminal electrodes, is passed through the cell wall connecting the two cells and potted in a Derakane™ resin. This cell is charged and discharged repeatedly. Charging was done at a potential of 12 volts. Open circuit voltage on full charge is 10 volts. The coulombic efficiency is typically over 99%.

EXAMPLE 5

A secondary lithium ion battery, containing two terminal cells with one pseudo bipolar connecting electrode is constructed using the fibers produced in example 2. The battery is similar in construction to the rectangular battery shown in FIG. 5. The electrodes of each cell consist of thin planar sheets made from the tows of fibers and having a dimension of 4 in² (25 cm²). A thin nickel busbar, forming an electron collector strip, is applied to the fiber ends along one edge of the electrode by dipping the fiber ends into a nickel salt containing solution thereby slowly electroplating the nickel from the solution onto the fiber ends until a solid collector strip has grown along the edge of the planar electrode sheet. A terminal connector is attached, by soldering to one end of the collector strip. The collector strip is potted into the top of the cell wall which is comprised of a nonconductive DERAKANE® resin coating. A very thin coating of nickel is also plated onto a half portion of the pseudo bipolar electrode to which a coating of $LiCoO_2$ active material is applied as illustrated in FIG. 5 A. A non-woven polypropylene scrim having a thickness of 180 to 200 micrometer is positioned between the electrode sheets for use as a separator sheet. An electrolyte comprising 10% $LiPF_6$ in propylene carbonate is dried to less than 5 ppm $H_2O$ using highly activated zeolite molecular sieves. The electrodes and separator are dried and assembled in a dry box containing less than 1 ppm water. This assembly is placed into a housing of PVC having a wall thickness of 2 min. The PVC housing is provided on the outer surface with an aluminum foil having a thickness of 50 microns. The housing is filled with the dried electrolyte and 1.5 g of highly activated zeolite molecular sieves. The housing is then sealed with the collector strips and terminals of each electrode potted in a Derakane™ brand vinyl ester resin seal and protruding through the top of the housing lid. The completed assembly is then removed from the dry box and tested as a battery cell. The cell is electrically charged, then discharged to 80% of its charge capacity. The working voltage of the cell is 3.8 V. The capacity of each cell is greater than 1450 coulombs per gram of carbon electrode (excluding carbon used as collector frame material in metal oxide electrode) and each cell has a coulombic efficiency of greater than 98%.

What is claimed is:

1. An electrically conductive carbon fiber derived from a stabilized polymeric precursor material, said fiber having a generally non-circular or tubular cross-sectional shape, a Young's modulus of from greater than 1 MM psi (6.9 GPa) to 55 MM psi (380 GPa), and wherein said carbon fiber is flexible and has a bending strain value of greater than 0.01% but less than 50%.

2. The flexible carbon fiber of claim 1, having a bending strain of from 0.1 to 30%.

3. The flexible carbon fiber of claim 1, having a diameter of from 1 micrometer to 15 micrometers, a carbon content of from greater than about 85% to 99% by weight, and a specific resistivity of less than 0.5 ohm-cm.

4. The flexible carbon fiber of claim 3, having a carbon content of from about 95% to 98% by weight, and specific resistivity of from about 0.0005 to less than 0.5 ohm-cm.

5. The flexible carbon fiber of claim 1, having a surface area of from greater than 1 to about 150 m²/g, and a contiguous fiber surface that is substantially free of pits and pores, said surface having micropores representing less than 5% of the total surface area of the fiber.

6. The flexible carbon fiber of claim 5, having a surface area of from about 10 m²/g to about 150 m²/g.

7. The flexible carbon fiber of claim 1, wherein said polymeric precursor material is an unfiltered acrylic polymer containing from about 0.0001 to about 5% by weight particulate matter having a diameter of less than about 0.1 microns.

8. The fiber of claim 1, wherein said polymeric precursor material is a sub-acrylic resin selected from the group consisting of copolymers and terpolymers of acrylonitrile, wherein said copolymers and terpolymers contain less than 85 mole percent acrylic units and greater than 15 mole percent of one or more plasticizer polymers copolymerized therewith.

9. The fiber of claim 8, wherein said copolymers and terpolymers contain up to 35 mole percent of one or more plasticizer polymers.

10. The fiber of claim 8, wherein said plasticizer polymer is selected from the group consisting of vinyl chloride, methyl acrylate, methyl methacrylate, polyvinyl chloride, cellulose esters, phthalates, adipates, and sebacate esters, polyols such as ethylene glycol and its derivatives, tricresyl phosphate, caster oil, and mixtures thereof.

11. The fiber of claim 1, wherein said polymeric precursor material is an acrylic resin selected from the group consisting of copolymers and terpolymers of acrylonitrile, wherein said copolymers and terpolymers contain more than 85 mole percent acrylic units and less than 15 mole percent of one or more plasticizer polymers copolymerized therewith.

12. The fiber of claim 1, for use as an electrode in a secondary energy storage device.

13. An electrode comprising a multiplicity of carbon fibers derived from a stabilized polymeric precursor material, each said carbon fibers having a generally non-circular or tubular cross-sectional shape, a Young's modulus of from greater than 1 MM psi (6.9 GPa) to 55 MM psi (380 GPa), and a bending strain value of from greater than 0.01 to about less than 50%, said electrode having an electron collector conductively associated with a peripheral edge or edge portions of the fibers, and an electrically conductive terminal connected to said electron collector.

14. The electrode of claim 13, wherein said multiplicity of carbon fibers are in the form of a fiber tow, a fiber sheet or board, a non-woven web, or a woven or knit fabric.

15. The electrode of claim 13, for use in a secondary energy storage device.

16. A secondary energy storage device comprising a water impervious housing having an interior chamber forming a cell, a pair of electrodes positioned in said chamber, wherein said electrodes are electrically insulated or isolated from each other, each electrode having a current collector associated therewith, and each electrode being electrically connected to the exterior of the housing, wherein at least the positive electrode is comprised of a multiplicity of electrically conductive carbon fibers derived from a stabilized polymeric precursor material, said fibers being flexible and having a generally non-circular or tubular cross-sectional shape, a Young's modulus of from greater than 1 MM psi (6.9 GPa) to 55 MM psi (380 GPa), and a bending strain value of from greater than 0.01 to less than 50%, and an electrolyte in said cell comprising an ionizable salt in a non-aqueous liquid or paste.

17. The energy storage device of claim 16, wherein the electrolyte comprises a non-conductive, chemically stable, non-aqueous solvent and an ionizable salt dissolved therein, wherein the solvent is selected from compounds having oxygen, sulfur, and/or nitrogen atoms bound to carbon atoms in an electrochemically non-reactive state, and wherein the salt is an alkali metal.

18. The storage device of claim 17, wherein the electrolyte solvent is propylene carbonate and the alkali metal salt is a lithium salt.

19. The storage device of claim 16, wherein both of said electrodes are comprised of a multiplicity of electrically conductive carbon fibers.

20. The storage device of claim 16, wherein said housing is cylindrical in shape and said electrodes are of a tubular shape and positioned in said housing in a concentrically spaced relationship.

21. The storage device of claim 16, wherein said housing is cylindrical in shape and said electrodes are wound in a spiral shape and positioned in said housing, and an electrically insulating separator sheet positioned between said spirally wound electrodes.

22. A secondary energy storage device comprising a water impervious housing, said housing forming a chamber the interior surface of which is electrically non-conductive, at least one electrically insulating separator wall for separating the chamber into at least a pair of terminal cells, each terminal cell containing a terminal electrode which is provided with a current collector, and each said terminal electrode being electrically connected to a terminal on the exterior of the housing to facilitate the flow of stored electrical energy out of and the charge of electrical energy into the storage device, a bipolar electrode extending from one terminal cell through said electrically insulating separator wall into the adjacent terminal cell and forming a counter-electrode portion with each said terminal electrode, an ionically conductive separator sheet positioned between each said terminal electrodes and a bipolar counter-electrode portion for electrically insulating said terminal electrodes and said counterelectrode portions from each other, said bipolar electrode and at least one of said terminal electrodes being formed of a multiplicity of electrically conductive flexible carbon fibers, each said fiber having a generally non-circular or tubular cross-sectional shape, a Young's modulus of from greater than 1 MM psi (6.9 GPa) to 55 MM psi (380 GPa), and a bending strain value of from greater than 0.01 to less than 50%, and an electrolyte in each cell comprising an ionizable salt in a non-aqueous liquid or paste.

23. The storage device of claim 22, wherein said housing is cylindrical in shape and said terminal electrodes are of a tubular shape and positioned in said housing in a concentrically spaced relationship, a tubular separator wall positioned between said terminal electrodes, and said bipolar electrode extending through said tubular separator wall at a mid-portion thereof and forming said pair of bipolar electrode portions, each bipolar electrode portion forming a counterelectrode with said terminal electrode.

24. The storage device of claim 22, wherein said housing is cylindrical in shape and said electrodes are wound in a spiral shape having an electrically insulating separator sheet positioned between said spirally wound electrodes.

25. A high performance secondary energy storage device comprising a gas and water vapor impervious housing, said housing forming a chamber the interior surface of which is electrically non-conductive, at least one electrically insulating separator wall for separating the chamber into at least a pair of cells, each terminal cell containing a terminal electrode which is provided with a current collector, and each said terminal electrode being electrically connected to the exterior of the housing to facilitate the flow of stored energy out of and the charge of energy into the storage device, a pseudo bipolar electrode comprising a multiplicity of flexible carbon fibers extending from one terminal cell into the adjacent terminal cell and forming counter electrode portions with each said terminal electrode, wherein said terminal electrode and said counter electrode in each cell are electrically isolated or insulated from each other, wherein one terminal electrode comprises a collector frame formed of an electrically conductive material, said collector frame being coated with a lithium salt of a metal oxide of the empirical formula $Li(MO_2)_n$ in which M is a metal selected from the group VIIb and VIIIb of the periodic table, one portion of the pseudo bipolar electrode forming the counterelectrode with the coated terminal electrode comprising said flexible carbon fibers, and the other portion forming the counter electrode with a carbon fiber terminal electrode comprising said carbon fibers coated with a metal oxide $(MO_2)_n$ in which M is a metal selected from the group VIIb and VIIIb of the periodic table, and an electrolyte in each cell comprising an ionizable salt in a non-aqueous organic liquid.

26. The energy storage device of claim 25, wherein said metal oxide coating is selected from the group consisting of $CoO_2$, $NiO_2$ and $Mn_2O_4$.

27. The energy storage device of claim 25, wherein the electrically conductive material of the collector frame is selected from materials of the group consisting of electrically conductive metals, carbon, and metal coated carbon.

28. A composite pseudo bipolar electrode comprising a multiplicity of electrically conductive, carbon fibers, wherein a portion of the electrode fibers is coated with an ion active lithium salt of a metal oxide of the empirical formula $Li(MO_2)_n$ in which M is a metal selected from the group VIIb and VIIIb of the periodic table.

29. The electrode of claim 28, in which M is a metal selected from the group consisting of Co, Ni and Mn, where n=1 for Co and Ni and n=2 for Mn.

30. The electrode of claim 28, wherein said metal oxide coating is selected from the group consisting of $CoO_2$, $NiO_2$ and $Mn_2O_4$.

31. The energy storage device of claim 25, wherein the electrically conductive material of the terminal electrode is selected from materials of the group consisting of electrically conductive metals, carbon, graphite and metal coated carbon or graphite.

32. A secondary battery stack comprising at least two batteries that are electronically connected by means of a bipolar carbon fiber electrode, each battery having at least two cells one of which is a terminal cell, each terminal cell having a terminal carbon fiber electrode, a current collector connected to the terminal electrode, a terminal connected to the current collector and extending out of the battery for charging and discharging said battery stack, a bipolar carbon fiber electrode extending from the terminal cell into an adjacent cell, a second bipolar carbon fiber electrode extending from the adjacent cell of the first battery into a cell of the second battery, a third bipolar carbon fiber electrode extending from the cell of the second battery into the terminal cell of the second battery, and a terminal carbon fiber electrode in the terminal cell of the second battery, wherein the carbon fibers of said second bipolar electrode are oriented in a direction transverse to the direction of the carbon fibers in the first and third bipolar electrodes, and wherein the second bipolar electrode passes through a common wall separating the batteries, ion conductive separator sheets positioned between each pair of electrodes in each cell, and an electrolyte in each cell.

33. The battery stack of claim 32, wherein each of the batteries has at least one intermediate cell.

* * * * *